US012351338B2

(12) United States Patent
Senerth

(10) Patent No.: US 12,351,338 B2
(45) Date of Patent: Jul. 8, 2025

(54) SYSTEMS AND METHODS FOR SYNCHRONIZING GROUND POWER UNITS

(71) Applicant: Boom Technology, Inc., Centennial, CO (US)

(72) Inventor: James Senerth, Philadelphia, PA (US)

(73) Assignee: Boom Technology, Inc., Centennial, CO (US)

( * ) Notice: Subject to any disclaimer, the term of this patent is extended or adjusted under 35 U.S.C. 154(b) by 156 days.

(21) Appl. No.: 18/310,278

(22) Filed: May 1, 2023

(65) Prior Publication Data

US 2024/0367817 A1 Nov. 7, 2024

(51) Int. Cl.
*B64F 1/34* (2006.01)
*H02J 3/40* (2006.01)

(52) U.S. Cl.
CPC . *B64F 1/34* (2013.01); *H02J 3/40* (2013.01)

(58) Field of Classification Search
CPC ..................................... B64F 1/34; H02J 3/40
USPC ........................................................ 307/9.1
See application file for complete search history.

(56) References Cited

U.S. PATENT DOCUMENTS

2014/0167517 A1* 6/2014 Kinoshita ............... H02J 9/062
307/87

FOREIGN PATENT DOCUMENTS

JP 2004236394 * 8/2004

* cited by examiner

*Primary Examiner* — Richard Tan
(74) *Attorney, Agent, or Firm* — Brake Hughes Bellermann LLP

(57) ABSTRACT

Output signals from ground power units can be combined to supply more energy for aircraft to use for starting a jet engine. The combining can be possible when the outputs from the ground power units are synchronized. In a synchronization process, a first ground power unit may be started so that its first output signal serves as a reference for the synchronization. Then, an interconnect on a second ground power unit can be toggled to start and stop the generation of a second output signal at different times until the signals are in phase (i.e., synchronized).

22 Claims, 7 Drawing Sheets

SYSTEMS AND METHODS FOR SYNCHRONIZING GROUND POWER UNITS

FIELD OF THE DISCLOSURE

The present disclosure relates to a source of power for an aircraft, and more specifically, to a source of power configured to provide sufficient power to start a jet engine of the aircraft.

BACKGROUND

An aircraft may obtain electrical power from a variety of sources. When the aircraft is on the ground and the engines are OFF, electrical power may be supplied to the aircraft by a ground power unit (GPU). The GPU may be coupled electrically to the aircraft to supply the aircraft with three-phase electrical power (e.g., 115V, 400 Hz). The GPU may generate the three-phase power using a combustion generator or through an electrical conversion (i.e., power converter) of electricity supplied from a power grid (i.e., mains electricity). The GPU may be rated by the energy that it can safely provide. For example, a GPU found at an airport may be rated to provide an energy suitable for most aircraft using the airport. Accordingly, a standard energy rating (e.g., 90 kVA) for GPUs has evolved based on conventional aircraft requirements, and it may be typical for GPUs found at most airports to comply with this standard.

SUMMARY

In some aspects, the techniques described herein relate to a method for synchronizing ground power units, the method including: generating, using a first GPU, a first output signal; triggering a second GPU to output a second output signal; comparing the first output signal to the second output signal to measure a phase shift; and determining, based on the phase shift, if the first output signal and the second output signal are synchronized, otherwise: disabling the second GPU from outputting the second output signal; and repeating the triggering, the comparing, and the determining after a period, the period based on the phase shift.

In some aspects, the techniques described herein relate to a system for synchronizing ground power units, including: a first GPU configured to generate a first output signal; a second GPU configured to generate a second output signal when triggered and not generate the second output signal when disabled; and a processing module configured to iteratively synchronize the first output signal and the second output signal, wherein at each iteration the processing module is configured to: trigger the second GPU to output the second output signal; compare the first output signal to the second output signal to measure a phase shift; and determine, based on the phase shift, the first output signal and the second output signal are synchronized, otherwise: disable the second GPU from outputting the second output signal; and start a next iteration after a period based on the phase shift.

In some aspects, the techniques described herein relate to a method for starting a jet engine, the method including: iteratively synchronizing a slave output signal of slave GPU with a master output signal of a master GPU by restarting the slave GPU at different times until the slave output signal is synchronized with the master output signal; generating combined GPU power, after the slave output signal is synchronized with the master output signal, by combining the slave output signal and the master output signal in parallel. Starting the jet engine by applying the combined GPU power to a starter-generator to power an accessory gearbox to turn a shaft of the jet engine.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Aircraft innovation may require energy at levels that are higher than expected for conventional aircraft. One technical problem facing aircraft innovation is the lack of existing infrastructure to support higher energy requirements. The present disclosure describes systems and methods to address this problem by configuring existing ground power units (GPUs) to support the higher energy requirements in a way that is scalable and that can accommodate a variety of GPUs found in an ecosystem of ground-support equipment.

Starting a gas-turbine engine (e.g., jet engine) may require more electrical energy than other functions on an aircraft. During a start, electrical energy may be externally supplied to an accessory gearbox of the jet engine to turn a shaft of a turbine. The turning shaft may start air flowing through the jet engine to enable a combustion process so that the engine can sustain its movement without the externally supplied electrical energy.

Figure 1:
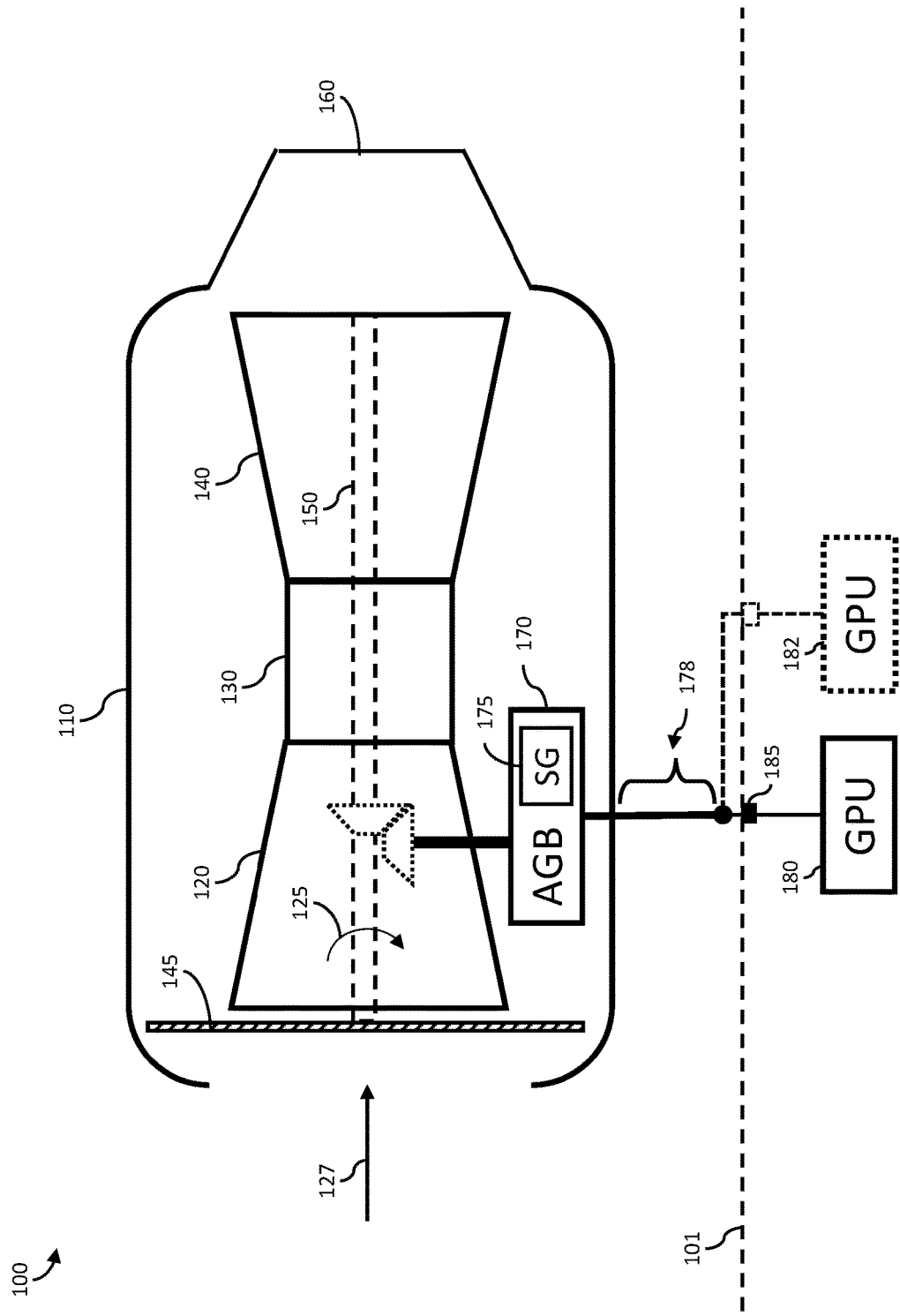
FIG. 1 is a block diagram that schematically depicts a system for starting a gas-turbine engine according to a possible implementation of the present disclosure.

FIG. 1 is a block diagram of a system for starting a jet engine of an aircraft according to a possible implementation of the present disclosure. The system 100 includes a gas-turbine engine (i.e., jet engine 110). The jet engine 110 includes a compressor portion 120, a combustion portion 130, and a turbine portion 140. For simplicity, the compressor portion 120 and the combustion portion 130 are shown as mechanically coupled by a shaft 150. In operation, the shaft 150 rotates to draw air 127 into the compressor portion 120 where it is compressed and heated. The heated air is drawn into the combustion portion 130, where the heated air and fuel are mixed and ignited, to form a continuous combustion. The turbine portion 140 is powered by exhaust gasses exiting the combustion portion 130. Energy from the turbine portion 140 may be used to power a fan 145 to provide propulsion. Further, propulsion may be provided by an exhaust nozzle 160, which can further accelerate exiting gasses.

An accessory gearbox 170 may be mechanically coupled to the shaft 150 in order to perform functions while the jet engine 110 is running. The accessory gearbox 170 may further include a starter-generator 175. The starter-generator 175 may be turned by the accessory gearbox 170 to operate as a generator (i.e., generator mode). In the generator mode, the starter-generator 175 is configured to output electrical power. Conversely, the starter-generator 175 may be configured (by externally supplied electrical power) to operate as a starter for the jet engine 110 (i.e., motor mode). In the motor mode, the starter-generator 175 may output mechanical power to the accessory gearbox 170 to turn the shaft 150.

The aircraft interface 101, shown in FIG. 1, may illustrate which elements can be integrated with (e.g., inside) an aircraft and which elements can be not integrated with (e.g., outside) the aircraft. For example, the GPU 180 may be external to the aircraft (e.g., part of a ground cart, part of a gate, etc.) while the accessory gearbox 170 (and the starter-generator 175) may be internal to the aircraft (e.g., within the jet engine 110). The GPU 180 may be electrically coupled to the aircraft while the aircraft is on the ground (e.g., at a gate of an airport) to supply electrical energy to subsystems (e.g., lighting, HVAC, etc.) that operate while the jet engine 110 is OFF. Accordingly, the aircraft interface 101 may include a connector 185 for electrically coupling the GPU 180 to an electrical bus 178 within the aircraft.

The GPU 180 may be configured to transmit power (i.e., energy per unit time) to the starter-generator 175 through the electrical bus 178 in order to (electrically) start the jet engine 110. Starting the jet engine 110 may require rotating the shaft 150 to a fraction of the operating rotational speed so that the airflow and combustion process described above can be started. For an electric start, the starter-generator 175 is operated as an electric motor (i.e., in start mode) to turn the accessory gearbox 170, which turns the shaft 150 of the jet engine 110. Each jet engine of an aircraft may include an accessory gearbox and each accessory gearbox may include a corresponding starter-generator. For example, an aircraft with four jet engines may include four accessory gearboxes and four starter-generators. A start process for the example aircraft may include electrically starting a first jet engine using a GPU, which operates the first starter-generator as a starter (i.e., in motor mode). Once the first jet engine is started, the first starter-generator may operate as a generator (i.e., in generator mode) to supply electrical power. Accordingly, the GPU may be disconnected, and the other jet engines may be started using the electrical power generated by the first starter-generator (turned by rotating shaft 150) of the first jet engine.

For a successful start, the power supplied by the GPU 180 is required to start rotation of the shaft 150 from a stationary state to a moving state. Further, the power supplied by the GPU 180 is required to accelerate the speed of the rotation 125 to the necessary fraction of the operating rotation speed necessary for starting. Starting is not possible (or not safe) when the (electrical) energy rating of the GPU 180 (as measured in kilo-volt-amps (kVA)) is insufficient to accomplish either (or both) of these requirements.

Jet engines classified (in this disclosure) as conventional may have lower energy requirements for starting (e.g., <100 kVA), whereas jet engines classified (in this disclosure) as unconventional may have higher energy requirements for starting (e.g., >200 kVA). It may be undesirable (e.g., inefficient) for an airport to have lower-rated GPUs for starting conventional jet engines and higher-rated GPUs (e.g., custom GPUs) for starting unconventional jet engines. An example unconventional jet engine is a jet engine for an aircraft that can travel at speeds above the speed of sound (i.e., supersonic). The techniques described herein allow for both the conventional jet engines and the unconventional jet engines to use the lower energy rated GPUs for starting. It should be noted that a starter-generator of an unconventional aircraft may have a higher energy rating (e.g., 250 kVA) that is suitable for starting the other jet engines on the unconventional aircraft when operated as a generator (i.e., in generator mode).

As shown in FIG. 1, in a possible implementation, electrical power from the GPU 180 (i.e., first GPU) may be combined with electrical power from a second GPU 182 to deliver the (electrical) energy necessary for starting the jet engine 110. For example, the first GPU 180 and the second GPU 182 may be coupled electrically in a parallel connection (i.e., in parallel) to the electrical bus 178 so that the current supply to the starter-generator 175 is split (e.g., equally, not equally) between the two GPUs. In other words, the electrical bus may carry (i.e., transmit) combined GPU power from the two GPUs. As a result, the maximum power that can be supplied by the GPUs is increased (e.g., doubled). In other words, an effective energy rating of the combined GPUs is increased (e.g., doubled). Further, this effective energy rating may scale with the number of GPUs coupled together. Any number of GPUs may be combined to supply the energy required for an electrical start of the jet engine. Accordingly, the disclosed approach may be versatile for a variety of jet engines having different start energy requirements.

Figure 2:
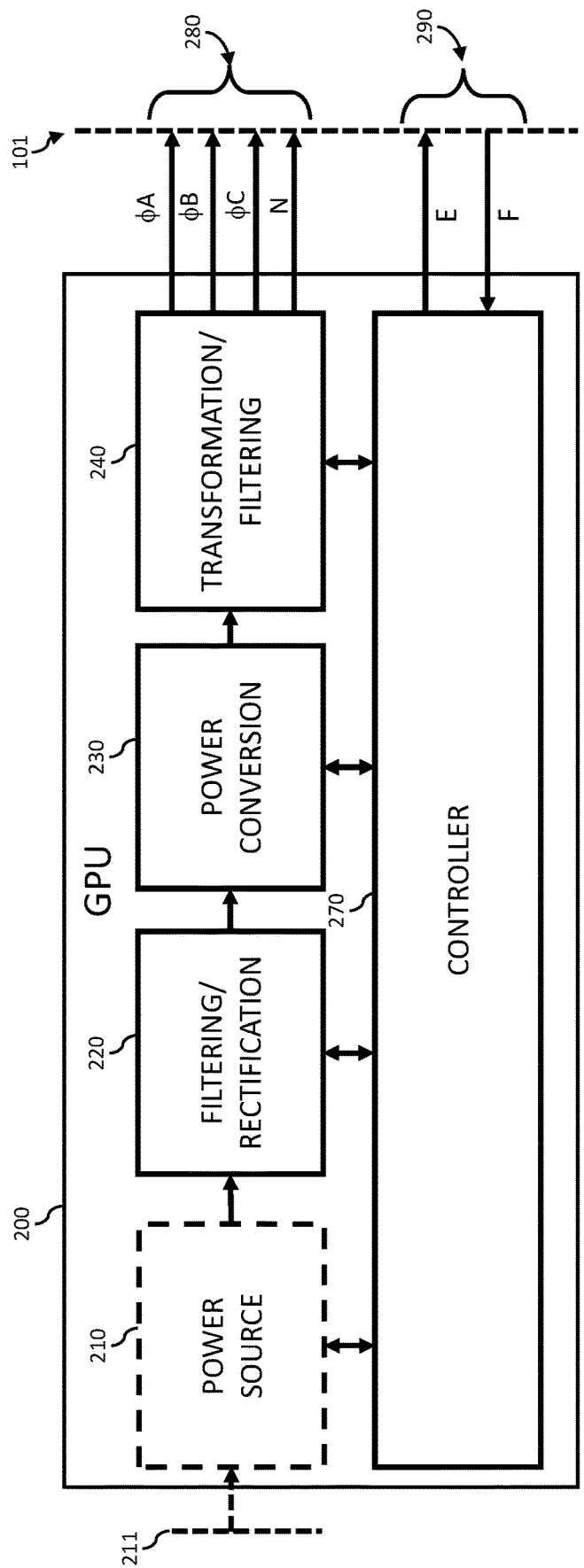
FIG. 2 is a block diagram of a ground power unit according to a possible implementation of the present disclosure.

FIG. 2 is a block diagram of a GPU according to a possible implementation of the present disclosure. The GPU 200 may include an internal power source 210. The internal power source may be a generator (e.g., combustion generator) configured to generate an alternating current (AC) supply signal (i.e., input signal). Alternatively, the GPU 200 may be coupled to an external power source at an external interface 211, such as a mains power (i.e., electrical grid), to receive the AC supply signal.

The GPU 200 includes a filtering/rectification stage 220 that can convert the incoming AC supply signal into a direct current (DC) signal. The DC signal may be output to a power conversion stage 230, which may include switching circuits, driven by pulse width modulation (PWM) signals, to convert the DC signal into an intermediate AC signal at a fundamental frequency and at a regulated voltage. The intermediate AC signal may be fed to a transformation and filtering stage 240, which may include a transformation configured to step (e.g., step-up, step-down) a secondary AC signal to an output voltage specified for the aircraft.

As shown in FIG. 2, the secondary AC signal (i.e., output signal) can include three phases. The output signal 280, at an output of the GPU, can include a first phase ($\phi A$), a second phase ($\phi B$), a third phase (C), and a neutral (N). Each phase may be at a fundamental frequency and phase shifted (e.g., ±120 degrees) from each other. In a possible implementation, the input signal can be a 3-phase 400 volts (V) AC signal at 60 Hertz (Hz) and the output signal can be a 3-phase 115V AC signal at 400 Hz with an energy rating of 90 kVA.

The GPU 200 includes a controller 270 that is configured (e.g., via software/firmware instructions) to manage the operation of the GPU 200 to provide a regulated output at various load conditions. As a requirement (e.g., for safety), the controller 270 may not generate the output signal 280 until a (proper) electrical connection (i.e., connection) between the GPU 200 and the aircraft interface 101 (e.g., a connector) is detected. In other words, after (e.g., immediately after) a connection between the GPU 200 and the aircraft interface 101 is detected, the controller 270 may start generation of the output signal 280. If (and when) the connection between the GPU 200 and the aircraft interface 101 is lost, the controller 270 may stop generation of the output signal 280. If (and when) the connection between the GPU 200 and the aircraft interface 101 is re-established, the controller 270 may restart generation of the output signal 280. The output signal 280 may begin at a phase each time it is started/restarted. For example, if the first phase ($\phi$A) output signal is started at 0 degrees (electrical) before the connection is lost then it may be restarted at 0 degrees after the connection is restored. The GPU 200 may be in an online condition (i.e., online) while it is generating the output signal (i.e., waveform) and in an online condition (i.e., offline) while it is not generating the output signal.

The connection between the GPU 200 and the aircraft interface 101 may be detected using an interlock signal 290 at an interlock port (e.g., E-F pins) of the GPU 200. In a possible implementation, the interlock signal 290 may include a transmitted signal that is transmitted from the GPU 200 (i.e., controller 270) to the aircraft over a first designated line/pin/channel (i.e., E) of the aircraft interface 101. The interlock signal 290 may further include a received signal that is transmitted from the aircraft to the GPU 200 over a second designated line/pin/channel (i.e., F) of the aircraft interface 101. A connection may be detected when the received signal matches the transmitted signal. For example, if 24V is applied to the E line/pin/channel and 24V is received at the F line/pin/channel, then a connection may be detected. Conversely, if 24V is applied to the E line/pin/channel and a different voltage (e.g., zero volts) is received at the F line/pin/channel, then an open connection (i.e., disconnect), or otherwise insecure connection, may be detected (i.e., a connection may not be detected).

To combine the outputs of a plurality of GPUs it may be necessary to synchronize (i.e., phase lock) their output signals. For example, when a first output signal of a first GPU and a second output signal of a second GPU have the same fundamental frequency and a relative phase difference that is approximately (e.g., within 1% of) zero, then the signals may add constructively when combined. Otherwise, the output signals can cause improper operation, such as not enabling a start of the jet engine 110. For example, unsynchronized outputs may cause one GPU to overpower the other and short circuit, thereby leaving the aircraft busses unpowered. Accordingly, the output signals may be synchronized (i.e., phase locked) prior to combining.

Synchronizing the output signals may include determining that the output signals are at approximately (e.g., within 1%) the same fundamental frequency (i.e., frequency). When the output signals are at the same frequency, their phase shift is fixed and does not change over time. Accordingly, determining synchronization may include determining that the phase shift does not change over a plurality of periods of either output signal. Synchronizing the output signals may further include determining that the phase shift is small (e.g., less than 5 degrees). Accordingly, determining synchronization may include determining that the phase shift between the output signals (i.e., relative phase shift) is below a predetermined phase shift (i.e., sync threshold). Ideally, a first output signal and a second output signal are synchronized when they are at the same frequency (i.e., phase shift is constant) and have a relative phase shift that is zero.

Synchronizing (i.e., phase locking) the output signals of a plurality of GPUs may require designating one of the output signals as a master output signal (i.e., reference output signal) and then adjusting the remaining output signals (i.e., slave output signals) so that their phase matches the phase of the master output signal. In other words, the plurality of GPUs may include a master GPU and one or more slave GPUs. Accordingly, one of a plurality of GPUs may be designated as a master GPU prior to adjusting the phases of the rest of the plurality of GPUs (i.e., the slave GPUs). In a possible implementation, the first GPU of the plurality of GPUs to come online may be designated (e.g., by the controller) as the master GPU.

Combining the output signal of the plurality of GPUs may require connecting the phases of the plurality of GPUs together. The connecting may be facilitated by an external power contactor (i.e., EPC) configured to receive the output signal 280 at an output of the GPU. In a possible implementation, the EPC is a triple-pole, single-throw (3PST) switching device. In other words, the EPC may include three, commonly controlled, single-pole, single-throw (SPST) switching devices, with each of the three switching devices coupled to each phase ($\phi$A, $\phi$B, $\phi$C) of the output signal 280. The three switching devices can be controlled (i.e., CLOSED/OPENED, ON/OFF) by a switch signal to connect/disconnect each phase ($\phi$A, $\phi$B, $\phi$C) of the output signal 280 to an output of the EPC.

Figure 3:
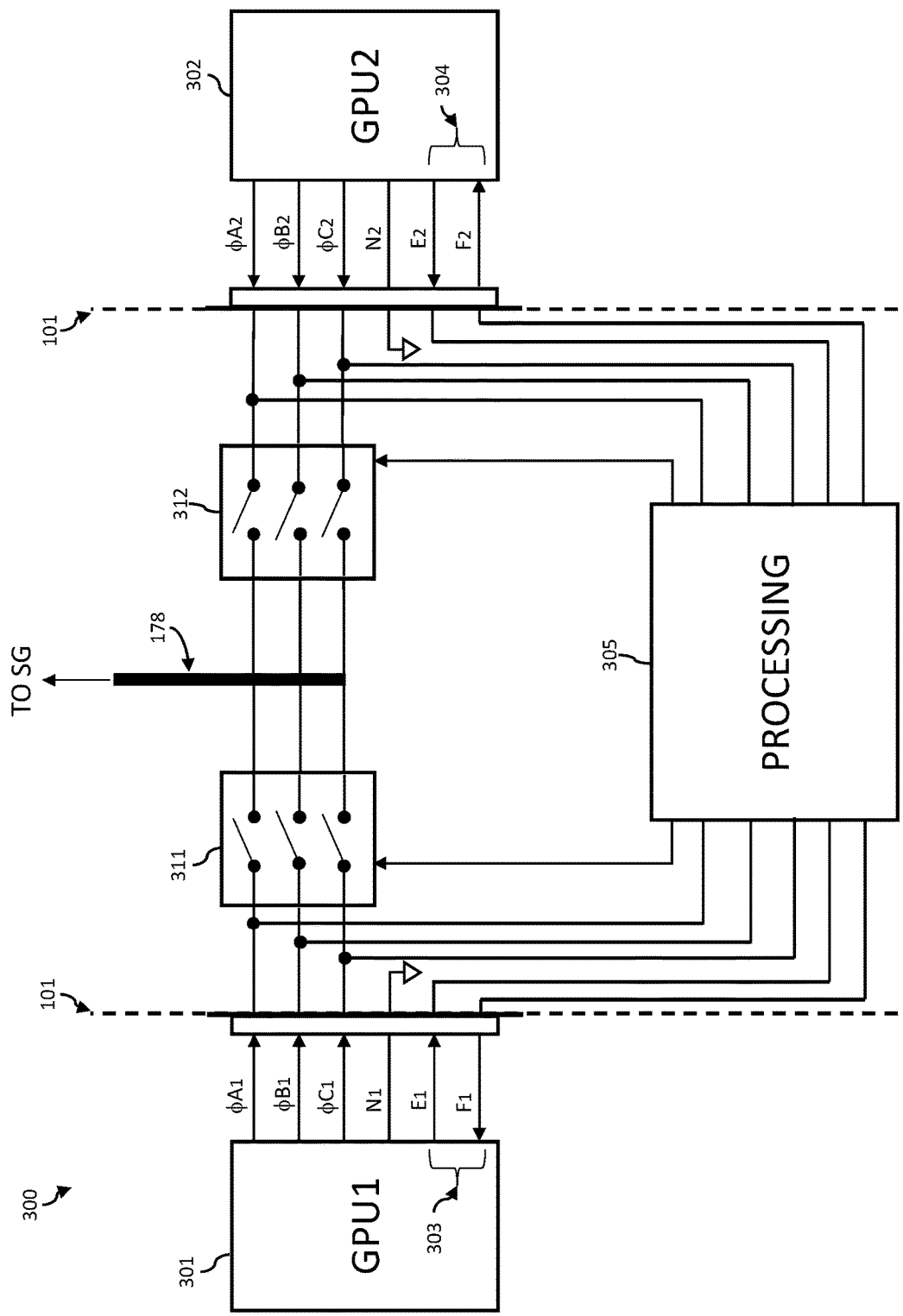
FIG. 3 is a block diagram of a system for synchronizing ground power units according to a possible implementation of the present disclosure.

FIG. 3 is a block diagram of a system for synchronizing ground power units according to a possible implementation of the present disclosure. The system 300 includes a first GPU 301 (i.e., GPU1) configured to generate a first output signal. As shown, the first output signal may include three phases and a neutral (i.e., $\phi$A1, $\phi$B1, $\phi$C1, N1). The system further includes a second GPU 302 (i.e., GPU2) configured to generate a second output signal. As shown, the second output signal may include three phases and a neutral (i.e., $\phi$A2, $\phi$B2, $\phi$C2, N2). Each of the GPUs may be coupled to the aircraft via a corresponding connector included in the aircraft interface 101

When connected to the aircraft interface 101 the neutrals of each output signal may be coupled to a ground of the system (e.g., aircraft), as shown, while each output signal may be coupled to a corresponding EPC. The system 300 further includes a first EPC 311 and a second EPC 312. When the EPCs are controlled ON (not shown), conductors carrying the first output signal and the second output signal are coupled together so that the signals can be combined (e.g., added). More specifically, phases of the first output signal (i.e., $\phi$A1, $\phi$B1, $\phi$C1) are connected in parallel to respective phases of the second output signal (i.e., $\phi$A2, $\phi$B2, $\phi$C2). The connected phases form a combined GPU power (i.e., $\phi$A1+$\phi$A2, $\phi$B1+$\phi$B2, $\phi$C1+$\phi$C2). The first EPC 311 and the second EPC 312 are coupled to the electrical bus 178 so that the combined GPU power may be transmitted to the starter generator while the jet engine is started.

The EPCs are controlled ON (i.e., conducting) and OFF (i.e., not conducting) by a processing module 305. The processing module 305 may be configured to perform operations based on instructions implemented in circuitry, firmware, software, or some combination thereof. For example, the processing module may be configured to monitor (e.g., periodically) the first output signal and the second output signal to determine a state of the system 300 (see FIG. 6) and then control the components of the system (e.g., GPUs, EPCs) in accordance with the state of the system. In particular, the processing module may perform operations in a method to synchronize the GPUs. It should be noted, the processing module may be coupled to any number of GPUs for synchronization, but two are shown because the more complex synchronization may still be carried out in pairs of a first GPU (master GPU) and a second GPU (slave GPU).

Figure 4:
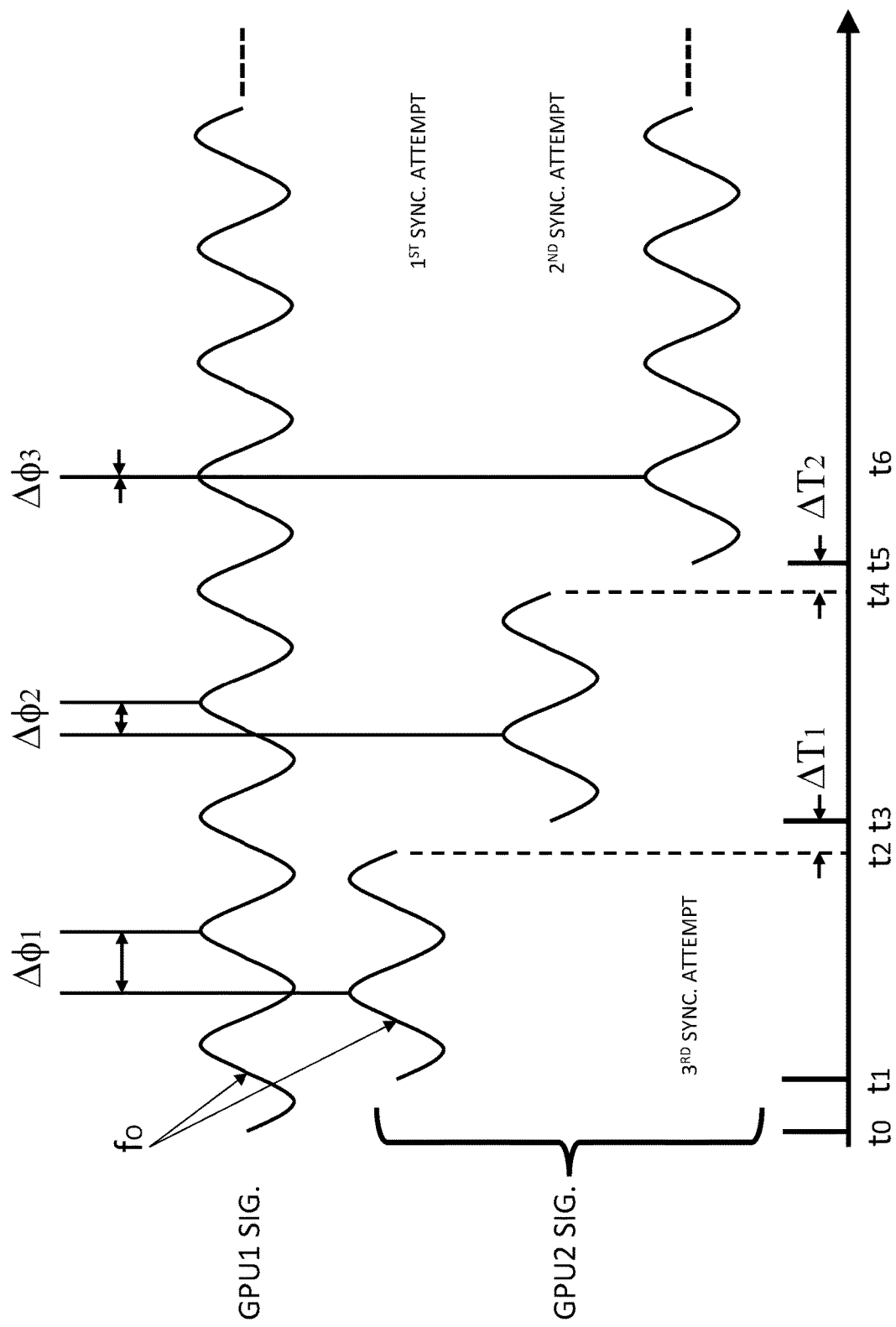
FIG. 4 illustrates graphs of signals from ground power units during a synchronization process according to a possible implementation of the present disclosure.

FIG. 4 are graphs of signals from ground power units during a synchronization process according to a possible implementation of the present disclosure. As shown, the first GPU 301 is started, or otherwise comes online, at a start time (t0) before the second GPU 302. Accordingly, the first GPU 301 output signal (i.e., GPU1 signal) can become the reference signal for a phase measurement (i.e., master GPU signal). The GPU1 signal may include only one phase because the other (two) phases are related to this phase.

A second GPU 302 is triggered (e.g., by the processing module 305) to generate (or otherwise output) a second GPU output signal (i.e., GPU2 signal) at a first time (t1) for a first synchronization (i.e., sync) attempt. During the first sync attempt the processing module can be configured to (i) measure the frequency of each output signal and (ii) measure a relative phase shift between the output signals. For the first sync attempt, the GPU1 signal and the GPU2 signal have the same fundamental frequency (fo) but have a first phase shift ($\Delta\phi 1$) that is larger than required for synchronization (i.e., above a sync threshold). Accordingly, the second GPU 302 may be triggered (e.g., by the processing module 305) to stop generating the GPU2 signal, thereby ending the first sync attempt at a second time (t2). The processing module may then wait a first period ($\Delta T1$) before triggering (i.e., starting) a second sync attempt at a third time (t3). In other words, after a current sync attempt (i.e., $1^{st}$ sync attempt), the synchronization process may be repeated in a subsequent sync attempt (i.e., $2^{nd}$ sync attempt) after a period (i.e., $\Delta T1$), which can be based on the phase shift (i.e., $\Delta\phi 1$) measured for the current sync attempt.

The first period ($\Delta T1$) may be based on the first phase shift ($\Delta\phi 1$) and a knowledge of the particular phase that the GPU2 signal is generated at after being triggered. As shown, in FIG. 4, the GPU2 signal is initially generated at the start of the first sync attempt (i.e., t1) at the same phase that it is initially generated at the start of the second sync attempt (i.e., t3). Because of this, the first period ($\Delta T1$) effectively shifts (i.e., aligns) the GPU2 signal with respect to the GPU1 signal.

At a third time (t3) after the first period ($\Delta T1$), the second GPU 302 is triggered (e.g., by the processing module 305) to generate (or otherwise output) the GPU2 signal for the second sync attempt. For the second sync attempt, the GPU1 signal and the GPU2 signal have the same fundamental frequency (fo), and while a second phase shift ($\Delta\phi 2$) for the second sync attempt may be smaller than the first phase shift ($\Delta\phi 1$), the second phase shift ($\Delta\phi 2$) is (still) larger than required for synchronization (i.e., above a sync threshold). Accordingly, the second GPU 302 may be triggered (e.g., by the processing module 305) to stop generating the GPU2 signal, thereby ending the second sync attempt at a fourth time (t4). The processing module may then wait a second period ($\Delta T2$), where the second period ($\Delta T2$) can be based on the second phase shift ($\Delta\phi 2$).

At a fifth time (t5) after the second period ($\Delta T2$), the second GPU 302 is triggered (e.g., by the processing module 305) to generate (or otherwise output) the GPU2 signal for a third sync attempt. For the third sync attempt, the GPU1 signal and the GPU2 signal have the same fundamental frequency (fo) and have a third phase shift ($\Delta\phi 3$) that is less than or equal to a predetermined phase shift required for synchronization (i.e., $|\Delta\phi 3| \le$ sync threshold). For the example shown, the third phase shift is measured at a sixth time (t6) to be approximately zero. Accordingly, at the sixth time (t6), the GPUs are in a synchronized state (i.e., synchronized). As a result, the second GPU 302 is not stopped but rather allowed to continue generating the GPU2 signal. After the sixth time (t6) (i.e., after synchronization), the GPU1 signal and the GPU2 signal can be combined. The combined signal will have approximately the same fundamental frequency (fo) and will have approximately double the ampacity of one GPU source.

The synchronization scenario illustrated in FIG. 4 is an example provided for explanation. It should be understood that variations to this example are within the scope of the disclosure. For example, the period between sync attempts can be fixed or vary in some way that does not depend on the phase shift. Further, more (or fewer) repetitions (i.e., sync attempts) may be executed before reaching synchronization.

Figure 5:
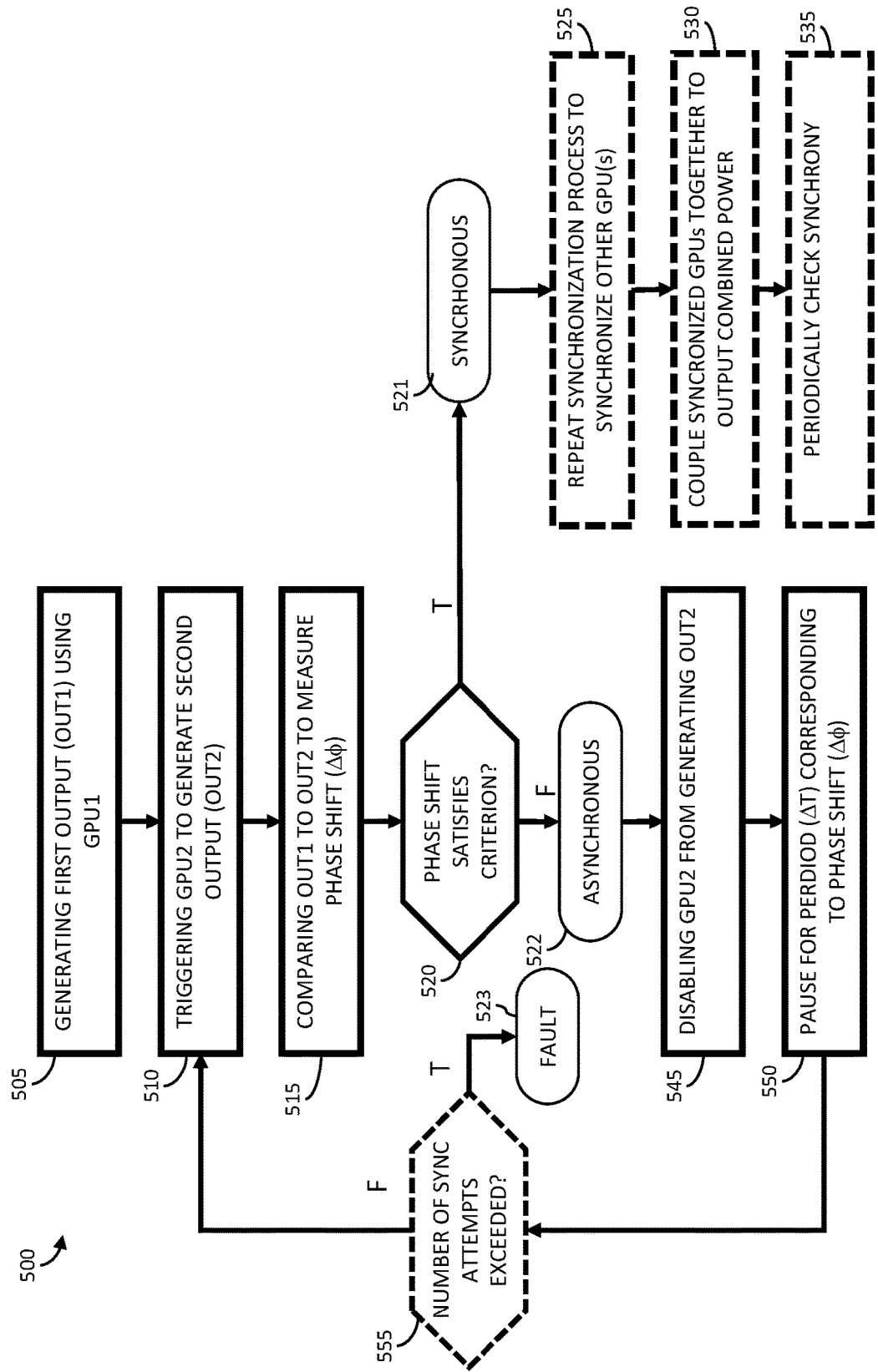
FIG. 5 is a flow chart of a method for synchronizing ground power units according to a possible implementation of the present disclosure.

FIG. 5 is a flow chart of a method for synchronizing ground power units according to a possible implementation of the present disclosure. The method 500 includes generating 505 the first output (OUT1) using the first GPU (GPU1). For example, the processing module 305 may trigger the first GPU 301 to generate the first output by transmitting an interlock signal to a first interlock port 303 of the first GPU 301. In a possible implementation, the processing module 305 may toggle a level on an interlock signal from a LOW level to a HIGH level (or vice versa) to trigger the first GPU 301 to transmit the first output signal. In another possible implementation, the first interlock port 303 may include a first E pin (E1) and a first F pin (F1) on a connector of the first GPU1 301 and triggering the first GPU 301 may include relaying a signal received from the first E (E1) pin back to the first F pin (F1) to satisfy an interlock condition required by the first GPU for generating the first output signal. In other words, the processing module may simulate an interlock condition in order to enable/disable the first GPU 301.

The method 500 further includes triggering 510, using the techniques described above, a second GPU (GPU2) to generate the second output (OUT2). For example, the processing module 305 may trigger the second GPU 302 to generate the second output by transmitting an interlock signal to a second interlock port 304 of the second GPU 302. In a possible implementation, the processing module 305 may toggle a level on an interlock signal from a LOW level to a HIGH level (or vice versa) to trigger the second GPU 302 to transmit the second output signal. In another possible implementation, the second interlock port 304 of the second GPU 302 may include a second E pin (E2) and a second F pin (F2) on a connector of the second GPU 302 and triggering the second GPU 302 may include relaying a signal received from the second E pin (E2) back to the second F pin (F2) to satisfy an interlock condition required by the second GPU for generating the second output signal. In other words, the processing module may simulate an interlock condition in order to enable/disable the second GPU 302.

The method 500 further includes comparing 515 the first output signal (OUT1) to the second output signal (OUT2) to measure a phase shift ($\Delta\phi$), as described above. The method 500 further includes determining 520 if the phase shift satisfies a criterion. In a possible implementation, the criterion is a comparison to a sync threshold, and when the phase shift is at or below the sync threshold the criterion is satisfied, otherwise it is not satisfied. When the phase shift satisfies the criterion (i.e., T), the first GPU and the second GPU may be in a synchronous state 521, and when the phase shift does not satisfy the criterion (i.e., F), the first GPU and the second GPU may be in an asynchronous state 522.

When the first GPU and the second GPU are in the asynchronous state (i.e., not synchronized) after a sync attempt has been made, the method 500 further includes disabling 545 the second GPU from generating the second output. In a possible implementation, the processing module 305 may toggle a level on an interlock signal to trigger the second GPU 302 to stop transmitting the second output signal. In another possible implementation, the triggering of the second GPU 302 may include not relaying a signal received from the second E pin (E2) back to the second F pin (F2) so that the interlock condition required by the second GPU for generating the second output signal is not satisfied. After disabling the second output signal, the method may include pausing 550 for a period (ΔT) before repeating steps of the method for a subsequent sync attempt. A duration of the pause (i.e., the period) may correspond to the (current) phase shift measurement.

In a possible implementation, the method 500 may include determining 555 if a number of sync attempts has been exceeded before beginning another sync attempt. If a number of repetitions of the method as at or above (i.e., exceeds) a sync-attempt threshold, the first GPU and the second GPU may enter a fault state 523 and no further sync attempts are executed until the fault state 523 is reset.

In various possible implementations, the method 500 may include further operations while in the first GPU and the second GPU are in the synchronous state 521. In a first possible implementation, the method 500 may further include repeating 525 the synchronization process described above in order to synchronize other GPUs. For example, a plurality of GPUs may each be synchronized to the first GPU. By synchronizing the plurality of GPUs with the first GPU they may be synchronized with one another. In another possible implementation, the method 500 may further include coupling 530 the synchronized GPUs together to output (i.e., form, generate) combined power. In another possible implementation, the method 500 may further include checking 535 the synchronicity of the GPUs periodically. For example, the first (or second) output signals may drift over time so that it is no longer synchronized with the second (or first) output signal. When this happens, the GPUs may enter the asynchronous state 522 and operations requiring the GPUs to be synchronous (e.g., power combining, jet engine start, etc.) may be paused or terminated until the synchronous state is restored.

Figure 6:
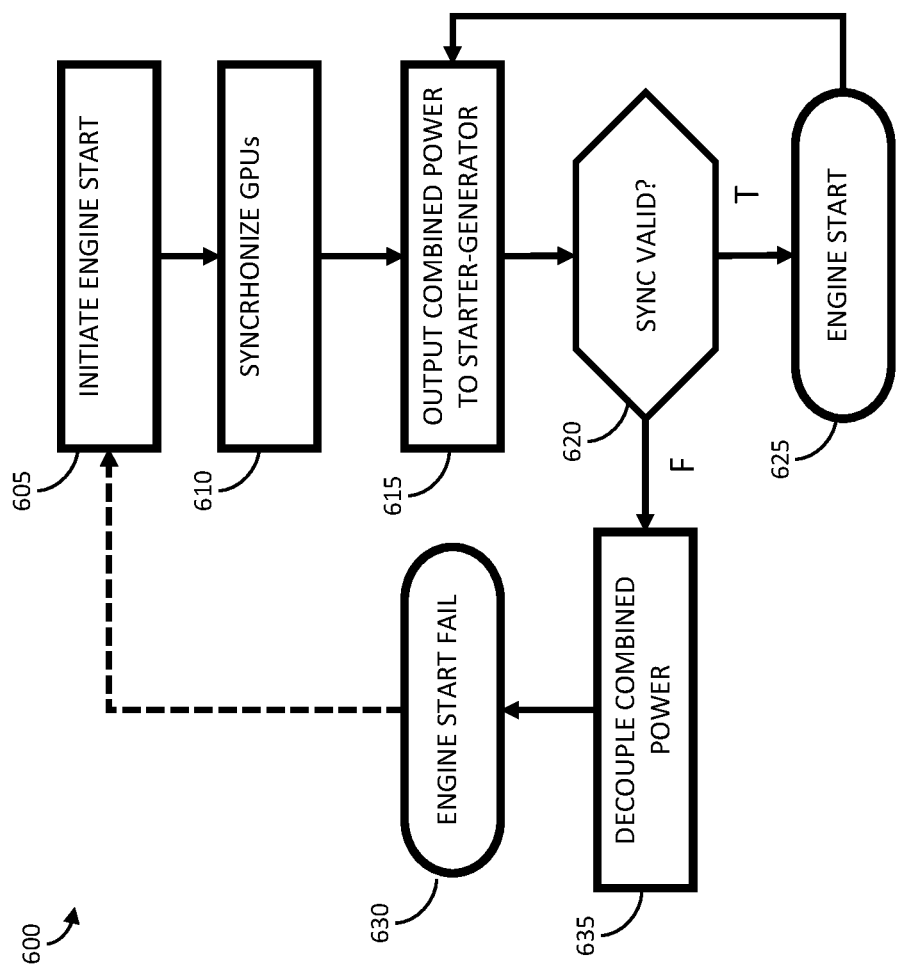
FIG. 6 is a flow chart of a method for starting a jet engine according to a possible implementation of the present disclosure.

FIG. 6 is a flow chart of a method 600 for starting a jet engine according to a possible implementation of the present disclosure. The method 600 includes initiating 605 an engine start after the GPUs are synchronized 610. The initiation may include coupling a plurality of GPUs to the aircraft. For example, a first GPU may be connected to a first connector on the aircraft and a second GPU may be connected to a second connector on the aircraft. The first GPU and the second GPU are not required to be the same make, model, or type as long as they can output signals that can be synchronized and as long as these signals can be activated and deactivated (e.g., using the interlock port) by the processing module. For example, the first GPU and the second GPU may be required to output signals at approximately (within 1%) the same fundamental frequency.

As mentioned, the method 600 further includes synchronizing 610 the GPUs, such as described previously (e.g., see FIG. 5). The method 600 further includes combining the output signals from the synchronized GPUs to output 615 combined power to the starter-generator (SG) of the aircraft. At this point, an engine start 625, as described previously, may begin. While the engine is starting, the method 600 may include (periodically) determining 620 if the synchronization (i.e., sync) is still valid. If so (i.e., T) then the engine start can continue uninterrupted. If, however, the sync is not valid (i.e., F) then the method 600 may include decoupling 635 the combined power from the starter-generator (e.g., turning OFF the EPCs) and the engine start fails 630.

Figure 7:
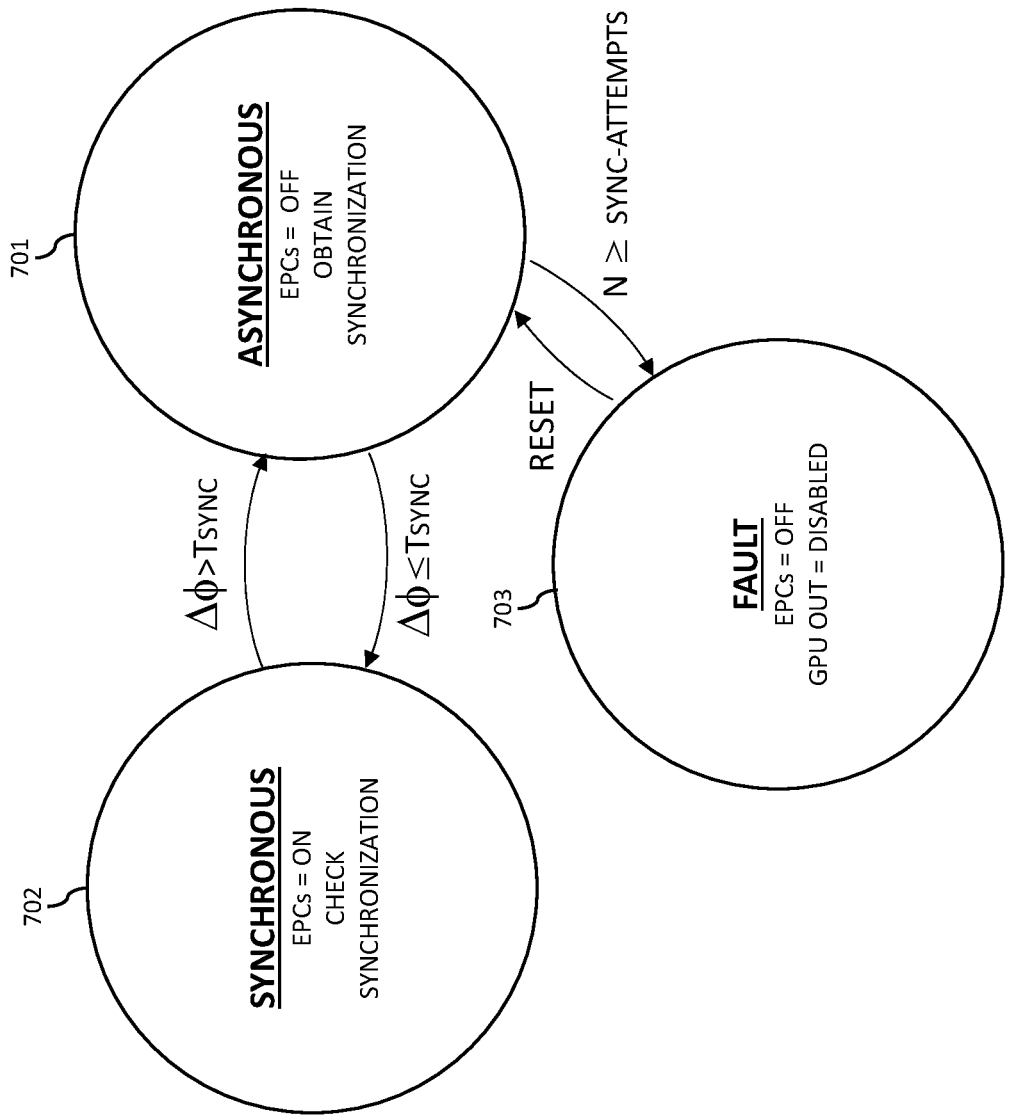
FIG. 7 is a state diagram of a system for synchronizing ground power units according to a possible implementation of the present disclosure.

FIG. 7 is a state diagram of a system for synchronizing ground power units according to a possible implementation of the present disclosure. A system for synchronizing GPUs (e.g., see FIG. 3) may be configured into a variety of states based on the output signals of the GPUs. AS shown the variety of states may include an asynchronous state 701, a synchronous state 702, and a fault state 703.

The system may start in the asynchronous state 701, with the EPCs (e.g., first EPC 311, second EPC 312) in the OFF (not conducting) condition. For example, a start of a jet engine may place the system in the asynchronous state 701. In the asynchronous state 701, the processing module 305 may be configured to perform a process to obtain synchronization that includes iteratively reducing a phase shift (Δφ) between the GPU output signals until it is less than or equal to a threshold (TSYNC) for synchronization. Upon the phase shift satisfying the criterion for synchronization (e.g., Δφ=0), the system may move to the synchronous state 702.

In the synchronous state 702, the processing module 305 may be configured to end the process to obtain synchronization. The processing module 305 may be further configured to combine the outputs of the GPUs. For this, the processing module may be configured to turn an EPC for each GPU ON (i.e., conducting) so that the outputs (e.g., three-phase outputs) of the GPUs are connected in parallel. In the asynchronous state 701, the processing module 305 may be configured to perform a process to check the synchronization to ensure that the phase shift (Δφ) between the GPU output signals remains less than or equal to a threshold (TSYNC) for synchronization. The synchronization may be checked periodically on a time scale (e.g., second) that is much longer than a time scale (e.g., millisecond) of a period of the GPU output signals. If a check shows that the phase shift is greater than the sync threshold, then the system may move back into the asynchronous state 701, thereby decoupling the GPU outputs and restarting the process to obtain synchronization described above.

A number (N) of tries (i.e., attempts) to obtain synchronization may be tracked to detect a fault in the system that is preventing synchronization. When the number (N) is greater than or equal to a (predetermined) sync-attempt threshold, then the system may move to the fault state 703. In the fault state, the GPU outputs are disabled and the EPCs are turned OFF to isolate each. A fault message may be transmitted from the system to an interface so that a user may take an action to repair the fault (e.g., bad connection). After the system is reset manually or automatically (e.g., when the fault is clear), the system may move back to the asynchronous state 701.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A method for synchronizing ground power units, the method comprising:
   generating, using a first ground power unit (GPU), a first output signal;
   triggering a second GPU to output a second output signal;
   comparing the first output signal to the second output signal to measure a phase shift; and
   determining, based on the phase shift, the first output signal and the second output signal are synchronized, otherwise:
      disabling the second GPU from outputting the second output signal; and
      repeating the triggering, the comparing, and the determining after a period, the period based on the phase shift.

2. The method according to claim 1, wherein the triggering the second GPU to output the second output signal includes;
   toggling a level of an interlock signal at an interlock port of the second GPU to trigger the second GPU to output the second output signal.

3. The method according to claim 1, wherein after the determining, based on the phase shift, the first output signal and the second output signal are synchronized:
   connecting a first output of the first GPU and a second output of the second GPU in parallel to an electrical bus so that the electrical bus transmits a combined GPU power.

4. The method according to claim 3, further comprising:
   starting a jet engine using the combined GPU power.

5. The method according to claim 1, wherein the repeating, the triggering, the comparing, and the determining after the period includes:
   repeating until the first output signal and the second output signal are synchronized; or
   repeating until a number of repetitions exceeds a sync-attempt threshold.

6. The method according to claim 1, wherein the determining, based on the phase shift, the first output signal and the second output signal are synchronized includes:
   determining that the phase shift is not changing over a plurality of periods of the first output signal or the second output signal; and
   determining that the phase shift is below a sync threshold.

7. The method according to claim 1, wherein:
   the first output signal includes three phases and the second output signal includes three phases; and
   comparing the first output signal to the second output signal includes measuring the phase shift of one of the three phases.

8. The method according to claim 1, wherein the phase shift is a first phase shift and the period is a first period, the method further comprising;
   enabling a third GPU to output a third output signal;
   comparing the third output signal to the first output signal to measure a second phase shift; and
   determining, based on the second phase shift, the third output signal and the first output signal are synchronized, otherwise:
      disabling the third GPU from outputting the third output signal; and
      repeating the triggering, the comparing, and the determining after a second period, the second period based on the second phase shift.

9. A system for synchronizing ground power units, comprising:
   a first ground power unit (GPU) configured to generate a first output signal;
   a second GPU configured to generate a second output signal when triggered and not generate the second output signal when disabled; and
   a processing module configured to iteratively synchronize the first output signal and the second output signal, wherein at each iteration the processing module is configured to:
      trigger the second GPU to output the second output signal;
      compare the first output signal to the second output signal to measure a phase shift; and
      determine, based on the phase shift, the first output signal and the second output signal are synchronized, otherwise:
         disable the second GPU from outputting the second output signal; and
         start a next iteration after a period based on the phase shift.

10. The system for synchronizing the ground power units according to claim 9, wherein the second GPU includes an interlock port, and the processing module is further configured to:
   transmit an interlock signal to the interlock port to trigger the second GPU to output the second output signal.

11. The system for synchronizing the ground power units according to claim 9, wherein after the first output signal and the second output signal are synchronized, the processing module is further configured to:
   configure a first output of the first GPU and a second output of the second GPU to be connected in parallel to an electrical bus so that the electrical bus transmits a combined GPU power.

12. The system for synchronizing the ground power units according to claim 11, wherein the electrical bus transmits the combined GPU power to a jet engine for starting.

13. The system for synchronizing the ground power units according to claim 11, wherein the processing module is configured to iteratively synchronize the first output signal and the second output signal by repeating until:
   the first output signal and the second output signal are synchronized; or
   a number of repetitions exceeds a sync-attempt threshold.

14. The system for synchronizing the ground power units according to claim 9, wherein to determine, based on the phase shift, the first output signal and the second output signal are synchronized, the processing module is configured to:
   determine that the phase shift is not changing over a plurality of periods of the first output signal or the second output signal; and
   determine that the phase shift is below a sync threshold.

15. The system for synchronizing the ground power units according to claim 9, wherein the first output signal includes three phases and the second output signal includes three phases.

16. The system for synchronizing the ground power units according to claim 9, wherein:
   the first GPU is designated as a master GPU; and
   the second GPU is one GPU of a group of GPUs designated as slave GPUs, each of the slave GPUs being iteratively synchronized with the first GPU by the processing module.

17. The system for synchronizing the ground power units according to claim 15, further comprising:
   a first external power contactor controlled ON/OFF by the processing module to couple/decouple the three phases of the first output signal to an electrical bus; and
   a second external power contactor controlled ON/OFF by the processing module to couple/decouple the three phases of the second output signal to the electrical bus.

18. The system for synchronizing the ground power units according to claim 17, wherein:
   the first external power contactor is controlled ON by the processing module after the first output signal and the second output signal are synchronized; and
   the second external power contactor is controlled ON by the processing module after the first output signal and the second output signal are synchronized.

19. The system for synchronizing the ground power units according to claim 17, wherein:
   the processing module, the first external power contactor, the second external power contactor and the electrical bus are included in an aircraft; and
   the first GPU and the second GPU are external to the aircraft.

20. A method for starting a jet engine, the method comprising:
   iteratively synchronizing a slave output signal of a slave ground power unit (GPU) with a master output signal of a master GPU by restarting the slave GPU at different times until the slave output signal is synchronized with the master output signal;
   generating combined GPU power, after the slave output signal is synchronized with the master output signal, by combining the slave output signal and the master output signal in parallel; and
   starting the jet engine by applying the combined GPU power to a starter-generator to power an accessory gearbox to turn a shaft of the jet engine.

21. The method for starting the jet engine according to claim 20, wherein restarting the slave GPU at the different times includes:
   toggling a level of an interlock signal at an interlock port of the slave GPU to trigger the slave GPU to generate the slave output signal.

22. The method for starting the jet engine according to claim 20, further comprising: determining that the slave output signal is synchronized with the master output signal based on:
   a phase shift between the slave output signal and the master output signal not changing over a plurality of periods of the master output signal or the slave output signal; and
   the phase shift between the slave output signal and the master output signal being below a sync threshold.

* * * * *